Aug. 20, 1929.   F. W. HORSTMANN   1,725,192
FUR MACHINE
Filed Jan. 6, 1927   3 Sheets-Sheet 1

F. W. HORSTMANN
INVENTOR

BY
ATTORNEYS

Aug. 20, 1929.   F. W. HORSTMANN   1,725,192
FUR MACHINE
Filed Jan. 6, 1927   3 Sheets-Sheet 2

F. W. HORSTMANN
INVENTOR

BY
ATTORNEYS

Aug. 20, 1929.  F. W. HORSTMANN  1,725,192
FUR MACHINE
Filed Jan. 6, 1927   3 Sheets-Sheet 3

F. W. HORSTMANN
INVENTOR

BY
ATTORNEY

Patented Aug. 20, 1929.

1,725,192

UNITED STATES PATENT OFFICE.

FREDERICK W. HORSTMANN, OF MAPLEWOOD, NEW JERSEY.

FUR MACHINE.

Application filed January 6, 1927. Serial No. 159,276.

This invention relates to machines for trimming the fur surface of skins or pelts and relates more particularly to mechanism for delivering a pelt to the shearing mechanism of such machines.

The preparation of skins or pelts for useful purposes involves the step of trimming or shearing the fur so that the soft fur is of uniform depth and perfectly smooth. In trimming the fur it has been customary to employ a machine including a shearing device and in so applying the skin to this device that the fur only is presented to the knives and thus sheared.

In accomplishing the above it has been found desirable to subject the fur to a vacuum, that is the fur is sucked toward the knives. However, when delivering the skins to the knives for shearing, it is necessary to employ a conveyor and to hold the skin or pelt in firm relation thereto during the cutting operation. Various devices, such as rollers and the like have been employed for so holding a skin but it has been found that when applied in the desired close proximity to the knives that the suction effect upon the fur was interfered with and when moved away to allow for such action, the skin would be lifted from the conveyor and be drawn into the knives.

For the purpose of attaining the desired result without the above-mentioned disadvantage it has been proposed to retain the skin by a multiplicity of pointed members sufficiently spaced apart to allow for the free movement of the fur under the action of the suction provided but sufficiently close to effectively retain the skin upon the conveyor.

A machine embodying the above device is shown and described in Patent No. 1,600,571, and the present invention aims to utilize the general construction shown therein but to improve the same to meet the practical demands of the fur industry with regard to the production of a more uniform product, convenience in operation, increase in the rate of production. and in making the machine more effective and automatic and adaptable for general factory use.

A machine of the present type may include a conveyor as for example, a flexible belt or apron comprised of canvas or rubber having projecting pins to which the unhaired surface of a skin may be attached. The conveyor may be movable about rollers and located so as to present the fur surface of a skin to a shearing device.

Adjacent the shearing device or rotary knives, I provide a rotary retainer member consisting of a plurality of sections having spindles with projecting pins. The sections are disposed with the spindles in alignment and transverse to the path of movement of the conveyor. By reason of the aligned sections a rotary element is provided which is of a flexible character. Each section may be resiliently held against the skin and may be adjustable vertically and the element will as a whole take the configuration of the surface of the skin. If, as often occurs, a skin is thicker in one portion than another, the whole rotary element will not be lifted from the other portion of the skin, but only the particular section under which the thickened portion travels will be raised and at the same time will effectively hold the skin at that portion.

Inasmuch as it is only necessary to apply the rotary retainer element to the last portion of a skin to be sheared, it is desirable to hold the said element in a position above the path of movement of the skin until the greater portion of a skin has passed beneath it.

The present invention, therefore, provides means for not only holding the rotary retainer element in an elevated position preparatory to application to the skin, but provides for the automatic lowering of the element at the proper time. Mechanism for accomplishing the above may comprise a rotary member such as a brush adapted to engage a skin as it is moved with the conveyor and so arranged that when a skin is thereunder the rotary retainer element will be elevated and when the skin has passed the rotary member mechanism will operate to lower the rotary retainer element. Thus the pins of the rotary element will effectively engage the skin and hold the same in proper relation to the conveyor at the same time permitting the suction action of the blower to freely operate to bring the fur to be cut into the path of the knives.

The invention will be more fully understood by reference to the accompanying drawings in which, Fig. 1 is a plan view of a machine embodying the present invention, Fig. 2 is an enlarged side view of a portion of the machine partly in section.

Figure 1:
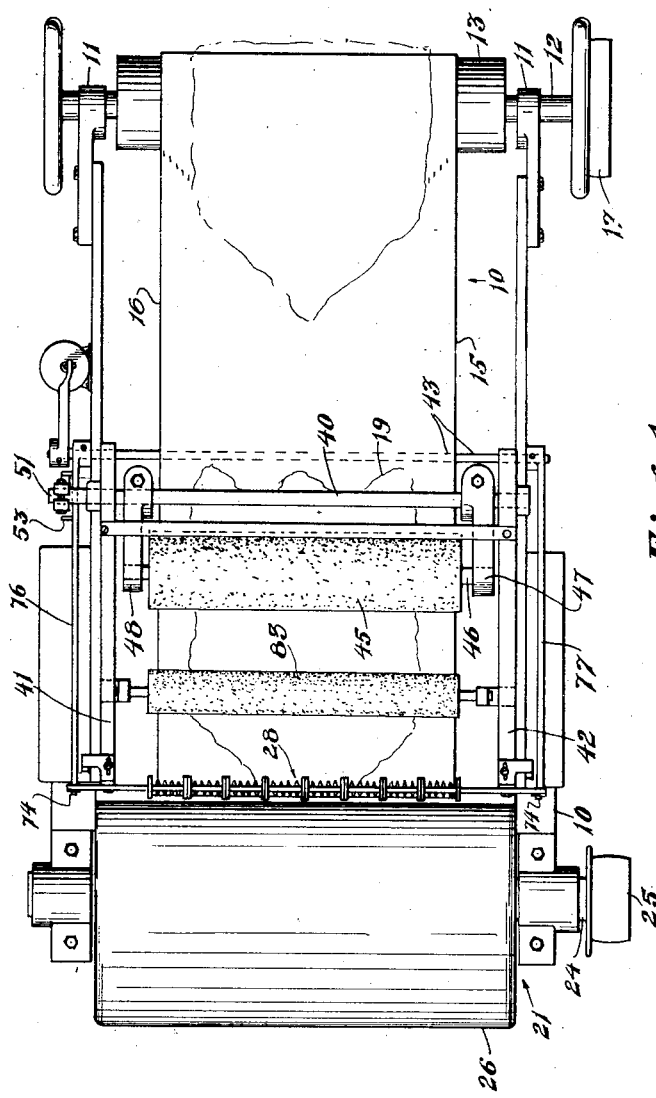

The present invention is applicable to various types of machines and as shown is applied to a fur shearing machine comprising a frame or supporting structure 10 provided with bearings 11 in which a shaft 12 having a relatively large roller 13 is mounted. The roller 13 in conjunction with a smaller roller 14 and an endless belt 15 constitutes a conveyor 16. The roller 14 may be rotatable in suitable bearings provided on the frame 10. For the purpose of driving the conveyor or canvas 15 thereof, the shaft 12 may be provided with a pulley 17 which may be driven by means of a belt (not shown) from any suitable source of power (not shown).

The canvas 15 may be provided with projecting pins 18 by means of which a skin 19 may be attached to the belt for movement therewith into operation relative to a shearing device 21 comprising the usual rotary cutter 22 and a bed knife 23. The rotary cutter may be secured to a shaft 24 journaled in suitable bearings in the frame 10 of the machine. A rotary motion may be transmitted to the cutter through a pulley 25 secured to the shaft 24. The pulley 25 may be connected by a belt (not shown) to another rotary part of the machine or to the shaft of a motor (not shown). A hood 26 encloses the cutters except at the point where the fur is applied for a shearing operation. By the employment of a suitable vacuum device, such as a fan (not shown), connected with a port 27, a sucking action is applied to the fur as it is moved toward the knives.

This suction has a tendency to lift the whole skin from the conveyor and in order to prevent such relative movement of the skin a rotary retainer element 28 is provided. This element in accordance with the present invention consists of a plurality of relatively short spindles or hubs 29 each of which is provided with radially projecting spokes in the form of pointed pins 31. The pins are provided in sufficient number and so spaced as to afford an effective engagement with a skin moved thereunder. The spindles 29 are normally disposed on a common longitudinal axial line, each spindle being rotatable in bearings 32 and 33 at the ends of guide members 34 and 35, respectively.

Figure 2:
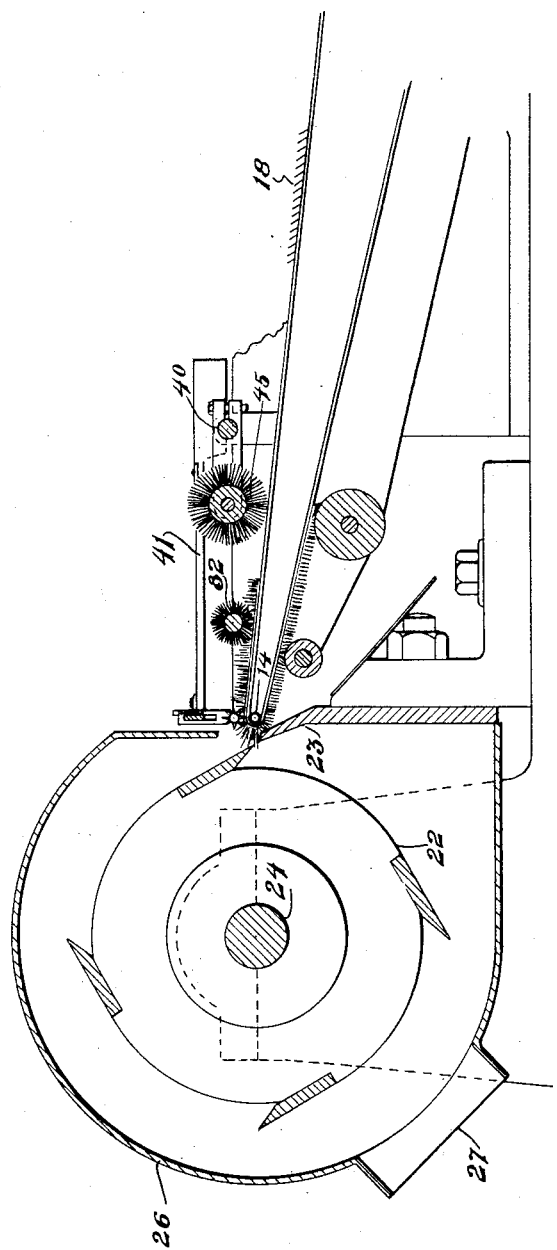
Figure 3:
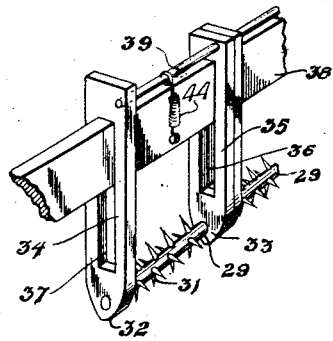
Fig. 3 is a perspective view of a section of the rotary element.

The guide members are provided with slots 36 and 37 through which a cross bar 38 extends, the bar being adjustably secured for horizontal and vertical adjustment at its opposite ends in arms 41 and 42, the opposite ends of the arms being provided with semi-circular notches 41' (Fig. 2) and adapted to rest on a spindle 40 which also serves for the operation of other mechanism to be presently described. A tie bar 42' is provided adjacent the notched ends of the arms to give rigidity to the structure. It will be evident that the rotary retainer element although a component part of the machine may be lifted therefrom without the manipulation of any mechanical connection and constitutes a unit which may or may not be applied to the machine as the occasion demands, or the unit may be conveniently removed when it is desirable to gain access to the rotary cutters for adjustment or for other purposes. Furthermore, by reason of the bolt 40'' and slot 41'' construction a horizontal adjustment of the retainer element with respect to the end of the conveyor is provided and in addition a bolt 42'' and slot 43'' adjustment is also provided so that the retainer element may be adjusted vertically in order that the limit of its downward movement may be readily governed.

The cross bar 38 acts mainly as a vertical retainer for the guide members 34 and 35 which are connected at their upper ends by a rod 39 and a spring 44 connected to the rod and to the cross bar 38 serves to normally move the spindle 29 downwardly or toward the conveyor to bring the pins 31 into engagement with a skin.

The rotary element comprises a sufficient number of the endwise disposed spindles 29 and since each spindle is self contained and adjustable vertically, the entire element may act as a single unit or as a plurality of units as when a skin passes thereunder which is of irregular thickness, in which case the spindle or spindles passing over the thickened portion will be lifted but their effectiveness in so far as holding the skin on the conveyor is concerned will remain constant owing to the action of the springs 44.

The position of the rotary retainer element 28 with respect to the conveyor is automatically controlled by means comprising a roller member in the form of a brush 45 having a shaft 46 journaled at the free ends of arms 47 and 48 clamped to the spindle 40 disposed transverse to and above the belt 15.

Figure 4:
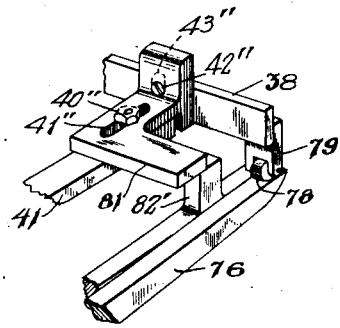
Fig. 4 is a perspective view of a portion of the machine and shows a contact member or stop for the retainer-member.
Figures 5, 6:
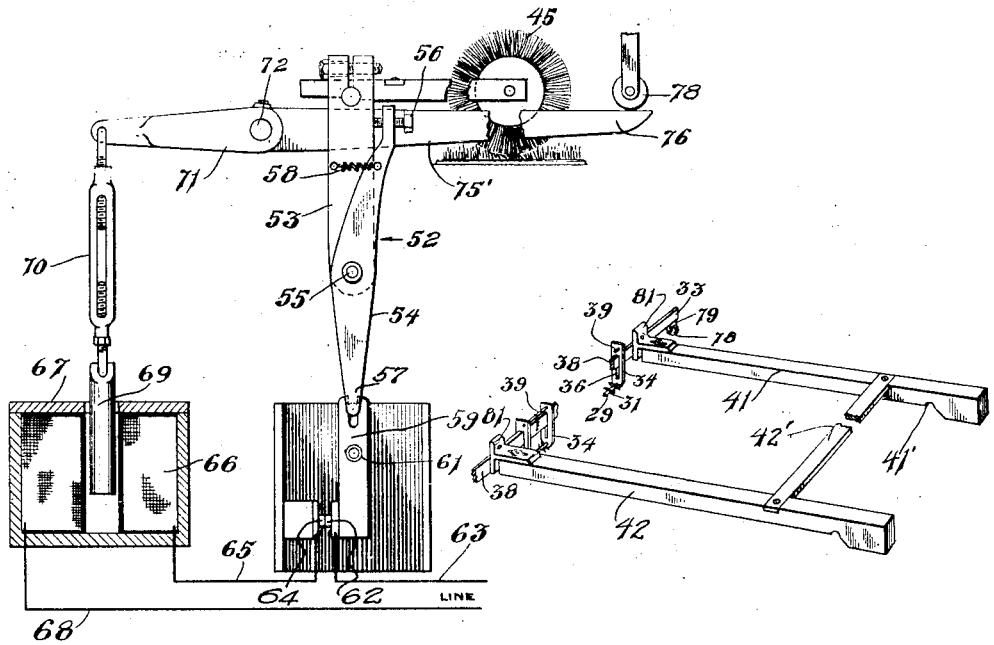
Fig. 5 is a fragmentary side view of a solenoid and associated mechanism for automatically lifting the rotary element.
Fig. 6 is a perspective view of the retainer element unit and illustrating the simplicity of its construction which enables it to be readily removed.

The spindle may be rotatable in suitable bearings secured to the frame 10 and an end 51 of the spindle is provided with a depending rocker arm 52 (see Fig. 5). This arm is composed of a link 53 having a lever 54 pivoted thereon at 55. One end of the lever is provided with a set screw 56 to adjust the relative position of the lower end 57 of the lever, a spring 58 serving to normally hold the lever in a fixed relation to the link 53. The lower end of the lever 54 is pivotally connected with a switch arm 59 rockable about a pin 61 and having a contact member 62 connected with a conductor 63 of an electrical circuit. The contact 62 is engageable with a contact 64 connected to a conductor 65 which in turn is connected to one side of a coil 66 of a solenoid 67; the opposite side of the coil being connected to a conductor 68. The conductors 63 and 68 may provide for a flow of electrical energy from any suitable source (not shown). When the circuit is closed by an engagement of the contacts 62 and 64 the coil of the solenoid or electro-magnet is energized which results in the attraction and movement of an armature 69. This armature is connected by an adjustable connecting rod 70 to a lever arm 71 pivoted on a fulcrum 72 suitably secured to a stationary portion of the machine. The lever arm may be provided with rocker bars 76 and 77, having a central portion 75′ the free ends of which engage with rollers 78 provided on extensions 79 (see Fig. 4) on opposite ends of the cross bar 38.

When the electro-magnet is energized, therefore, the rocker bars will be actuated and the rotary element 28 will be moved to an elevated position and when the electrical circuit is broken the rotary element will be disposed in operative relation to a skin as it is moved with the conveyor. For the purpose of preventing the weight of the entire rotary retainer element 28 from bearing on a skin stop arms 81 are provided and make contact with lugs 82′ integral with a stationary portion of the frame work of the machine.

In operation, skins may be applied to the conveyor, the rotary retainer element 28 being in its lower position since no skin has passed under the brush 45 to raise the same and the contacts 62 and 64 are thus out of engagement and the electrical circuit is broken and the weight of the rotary retainer element 28 causes it to take its lower position limited by the stops 82.

When the conveyor moves a skin beneath the brush 45 and it is raised the electrical circuit is closed and the armature 69 is drawn downwardly causing the rocker bars 76 and 77 to lift the rotary element 28 to hold the pin-pointed spindles away from the skin as it is moved into operative relation with the shearing device. As the end of the skin approaches the knives, however, and the skin moves from beneath the brush 45, the change in the position thereof causes a disengagement of the contacts 62 and 64 and the coil 66 is deenergized, thus permitting the rocker bars 76 and 77 to drop and dispose the rotary retainer element 28 in operative relation to the skins. It is obvious that by suitable adjustment the rotary element could be dropped on the skins either near the end or any other position of the skin. Inasmuch as the greatest difficulty arises from the suction lifting the end of the skin as it approaches the knives it has been found necessary to cause the rotary retainer element to function as the last portion of the skin passes the cutters.

Ordinarily the brush 45 would serve to hold the skin against the conveyor, but since in the present construction the said brush is removed a considerable distance from the cutters a supplemental brush 82 is provided so as to properly press upon the skin and hold it taut upon the conveyor as it passes under the retainer element 28. Although the retainer element is shown and described as constructed of a plurality of spindles having projecting pins it has been found that satisfactory results are obtained by employing thin sharp edge disks in place of the pins. The disks serve to hold the skins and at the same time the area of the disks in the path of the air flow due to the suction is so small as to be ineffective to hinder the required sucking of the fur. It is also apparent that the supplemental brush 82 will act to retain the skin upon the conveyor during the interval of time the rotary retainer element is being lowered into position upon the skin.

Although a preferred embodiment of the invention is shown and described herein, it is to be understood that modifications may be made therein without departing from the spirit and scope of the invention as set forth in the appended claims.

What is claimed is:

1. In a machine of the class described, the combination with a sectional retainer element adjustable in accordance with the configuration of the surface of a skin, of a plurality of contact points associated with said element.

2. In a machine of the class described, the combination of a yieldably movable retainer element comprising a plurality of sections for engagement with a material passing thereunder and means for permitting relative adjustment of said sections in accordance with irregularities in said material.

3. In a machine of the class described, the combination of a sectional rotary retainer element composed of a plurality of spindles having radially projecting pins for engagement with a skin passed thereunder, and means for supporting said element.

4. In a machine of the class described, a yieldably movable rotary retainer element comprising a plurality of aligned members having rigid projecting pins for engagement with a skin passed thereunder.

5. In a machine of the class described, the combination with a yieldably movable rotary retainer element comprising a plurality of aligned members, said members having rigidly projecting members, and means for tensionally holding the members to engage the pins with a skin passed thereunder.

6. In a machine of the class described, a rotary retainer element comprising a plurality of sections, each section having a spindle with pointed members projecting therefrom, a common guide for said sections, and means for permitting individual movement of the sections.

7. A retainer member for holding a skin in contact with a conveyor during movement toward the cutters of a fur shearing machine, comprising a frame, a yieldably movable rotary retainer element associated with said frame, means for disposing the frame in removable and rockable relation to the conveyor to position the retainer element in operative relation to a skin during movement toward the cutters.

8. A retainer member for holding a skin in contact with a conveyor during movement toward the cutters of a fur shearing machine, comprising a frame, means for disposing the frame in removable and rockable relation to the conveyor to position the retainer element in operative relation to a skin during movement toward the cutters, a rotary retainer element associated with said frame, means for holding said retainer element away from said skin and means for resiliently disposing said element in operative relation to a skin.

9. A retainer member for holding a skin in contact with a conveyor during movement toward the cutters of a fur shearing machine, comprising a frame, a rotary retainer element associated with said frame, means disposing the frame in removable and rockable relation to the conveyor to position the retainer element in operative relation to a skin during movement toward the cutters, means for holding said retainer element away from said skin, and means actuated by a skin movable with the conveyor to dispose said element in operative relation to said conveyor.

10. In a machine of the class described, the combination with a cutter, of a conveyor for moving a skin toward said cutter, a retainer element and means operable by the movement of a skin with said conveyor to position the retainer element into operative relation with the conveyor.

11. In a machine of the class described, the combination with a cutter, of a conveyor for moving a skin toward said cutter, a rotary retainer element comprising a plurality of sections, means for permitting individual movement of said sections, and means operable upon a movement of a skin with said conveyor to dispose said retainer element in an operative position.

In testimony whereof I affix my signature.

FREDERICK W. HORSTMANN.